United States Patent
Xu

(10) Patent No.: US 11,356,949 B2
(45) Date of Patent: Jun. 7, 2022

(54) SIGNAL TRANSMISSION METHOD, BASE STATION, AND NETWORK NODE

(71) Applicant: GUANGDONG OPPO MOBILE TELECOMMUNICATIONS CORP., LTD., Dongguan (CN)

(72) Inventor: Weijie Xu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/094,235

(22) Filed: Nov. 10, 2020

(65) Prior Publication Data

US 2021/0058865 A1 Feb. 25, 2021

Related U.S. Application Data

(63) Continuation of application No. PCT/CN2018/086569, filed on May 11, 2018.

(51) Int. Cl.
*H04W 52/02* (2009.01)
*H04W 76/28* (2018.01)
(Continued)

(52) U.S. Cl.
CPC ......... *H04W 52/0229* (2013.01); *H04W 8/24* (2013.01); *H04W 52/0216* (2013.01);
(Continued)

(58) Field of Classification Search
CPC .................................................. H04W 52/02
See application file for complete search history.

(56) References Cited

U.S. PATENT DOCUMENTS

| 8,902,803 B2 * | 12/2014 | Asterjadhi | ........ | H04W 52/0216 |
| | | | | 370/311 |
| 2017/0280388 A1 * | 9/2017 | Asterjadhi | ............ | H04W 88/08 |

(Continued)

FOREIGN PATENT DOCUMENTS

| CN | 107735975 A | 2/2018 |
| EP | 2 941 063 A1 | 4/2015 |

(Continued)

OTHER PUBLICATIONS

3GPP TSG RAN WG1 Meeting #92bis, Qualcomm, Further discussion on Wake-up signal functions (Year: 2018).*
(Continued)

*Primary Examiner* — Ayanah S George
(74) *Attorney, Agent, or Firm* — Bayes PLLC

(57) ABSTRACT

Disclosed herein are a signal transmission method, a base station, and a network node. A base station obtains a wake-up capability of a terminal device. The base station determines, according to the wake-up capability, a first time position for sending a power-saving signal. The base station sends the power saving signal to the terminal device on the first time position. The power-saving signal is used for indicating that the second terminal device wakes up or sleeps at a second time position. The wake-up capability includes a first wake-up capability and a second wake-up capability. The wake-up time of the terminal device having the first wake-up capability is longer than the wake-up time of the terminal device having the second wake-up capability. Therefore, by obtaining the wake-up capability of the terminal device and determining, according to the wake-up capability of the terminal device, the time position for sending a power-saving signal, the base station can ensure that the terminal device effectively wakes up or sleeps according to the power saving signal.

22 Claims, 4 Drawing Sheets

(51) Int. Cl.
*H04W 8/24* (2009.01)
*H04W 68/00* (2009.01)

(52) U.S. Cl.
CPC ..... *H04W 52/0235* (2013.01); *H04W 68/005* (2013.01); *H04W 76/28* (2018.02)

(56) References Cited

U.S. PATENT DOCUMENTS

| | | | |
|---|---|---|---|
| 2017/0332327 | A1 | 11/2017 | Fang et al. |
| 2019/0053160 | A1* | 2/2019 | He .................. H04W 52/0206 |
| 2019/0253973 | A1 | 8/2019 | Li et al. |
| 2019/0320490 | A1* | 10/2019 | Liu .................. H04W 52/0216 |
| 2019/0363843 | A1* | 11/2019 | Gordaychik .......... H04L 1/1854 |

FOREIGN PATENT DOCUMENTS

| | | |
|---|---|---|
| RU | 2578166 C1 | 3/2016 |
| WO | 2017026188 A1 | 2/2017 |
| WO | 2018076749 A1 | 5/2018 |
| WO | 2019/213952 A1 | 11/2019 |

OTHER PUBLICATIONS

3GPP TSG RAN WG1 Meeting #92bis, Qualcomm, Further discussion on WUS configurations and procedures (Year: 2018).*
PCT Written Opinion of The International Searching Authority issued in corresponding International Application No. PCT/CN2018/086569, dated Jan. 30, 2019, 9 pages.
"Further discussion on Wake-up signal functions", Agenda Item: 6.2.7.1.1.1, Source: Qualcomm Incorporated, 3GPP TSG RAN WG1 Meeting #92bis, R1-1804918, Sanya, China, Apr. 16-20, 2018, 7 pages.
"On wake-up signal functionalities", Agenda Item: 6.2.6.1.1.1, Source: OPPO, 3GPP TSG RAN WG1 Meeting 91, R1-1719997, Reno, USA, Nov. 27-Dec. 1, 2017, 4 pages.
"On 'wake up signal' for eFeMTC", Agenda Item: 6.2.6.3, Source: Huawei, HiSilicon, 3GPP TSG RAN WG1 Meeting #92bis, R1 1803885, Sanya, China, Apr. 16, 20, 2018, 7 pages.
"Power Saving Signal for efeMTC", Agenda Item: 6.2.6.3, Source Intel Corporation, 3GPP TSG RAN WG1 Meeting #92bis, R1-1804694, Sanya, China, Apr. 16-Apr. 20, 2018, 10 pages.
Supplementary European Search Report issued in corresponding European Application No. EP 18 91 8182.9, dated Mar. 17, 2021, 9 pages.
First Official Action issued in connection with corresponding Russian Application No. 2020139663, dated Aug. 25, 2021, 13 pages.
First Office Action issued in corresponding Canadian Application No. 3,099,868, dated Nov. 15, 2021, 4 pages.
"Further discussion on WUS configurations and procedures", Agenda item: 6.2.7.1.1.2, Source: Qualcomm Incorporated, 3GPP TSG RAN WG1 Meeting #92bis, R1-1804919, Sanya, China, Apr. 16-20, 2018, 8 pages.
Notification of Reason for Refusal issued in corresponding Korean Application No. 10-2020-7033482, dated Feb. 3, 2022, 14 pages.
Notice of Reasons for Refusal issued in corresponding Japanese Application No. 2020-563604, dated Mar. 22, 2022, 8 pages.
"Wake-up signal for NB-IoT & eMTC", Agenda Item: 9.13.9, Source: Ericsson, 3GPP TSG-RAN WG2 #100, R2-1713033, Reno, NV, USA, Nov. 27-Dec. 1, 2017, 9 pages.

* cited by examiner

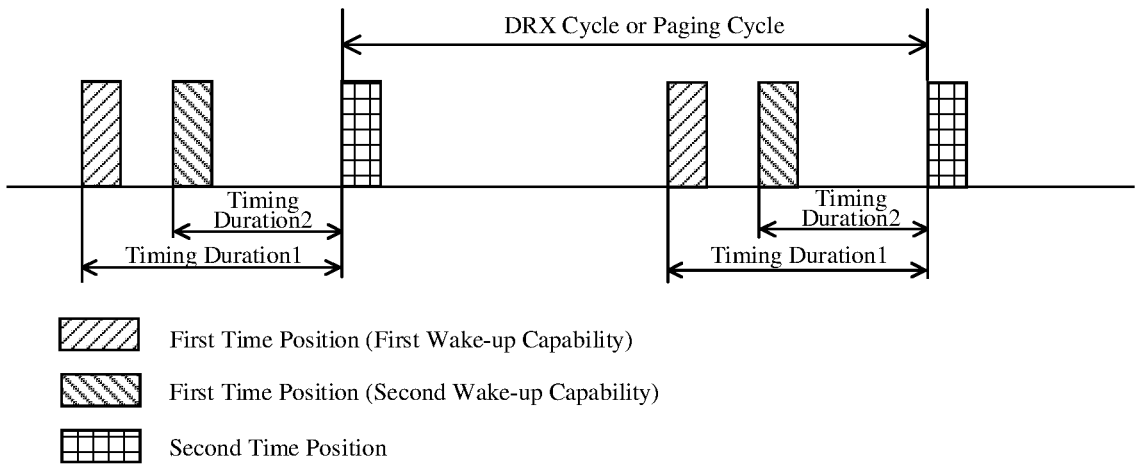
FIG. 4 (a)
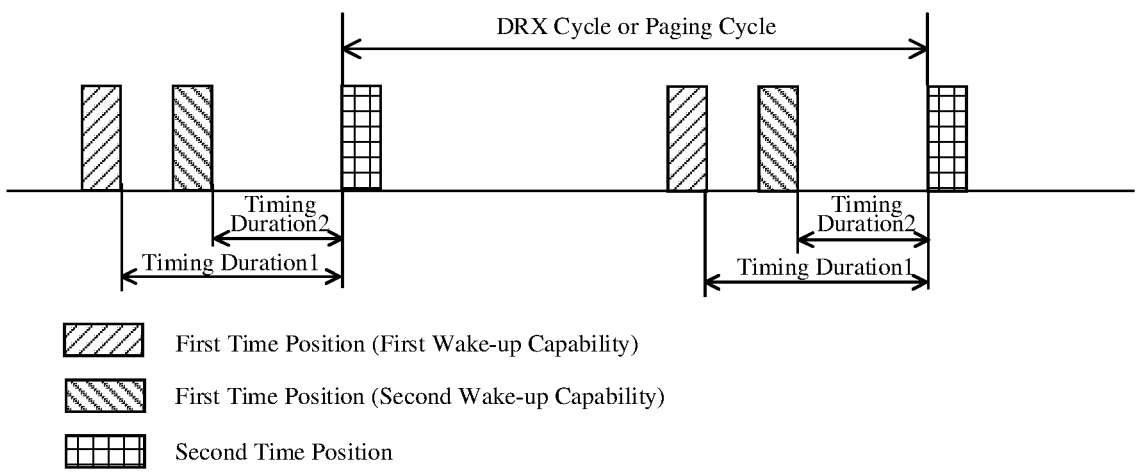
FIG. 4 (b)
The first network node determines the wake-up capability of the terminal device, and the wake-up capability is used by the base station to determine the first time position for sending the power saving signal — 510
The first network node indicates the wake-up capability to the base station — 520
FIG. 5

SIGNAL TRANSMISSION METHOD, BASE STATION, AND NETWORK NODE

CROSS-REFERENCE TO RELATED APPLICATION

This application is a continuation application of International Application No. PCT/CN2018/086569, filed May 11, 2018, the entire contents of which are incorporated herein by reference.

BACKGROUND

Embodiments of the present disclosure relate to the field of communication technology, and in particular, to a signal transmission method, a base station, and a network node.

Discontinuous Reception (DRX) mechanism has been introduced in view of the power saving of terminal equipment. Each DRX cycle includes an activation period (on duration) and a sleep period (Opportunity for DRX). In the on duration (also referred to as the awake duration), the terminal device detects the control channel; while in the Opportunity for DRX (also referred to as the sleep duration), the terminal device may reduce the power consumption by stopping reception of the control channel (in which case the terminal device stops the blind detection of the control channel), thereby increasing the battery life.

In the 5G system, a power-saving signal is introduced for controlling the state of the terminal device to achieve power saving purposes. For example, the power-saving signal may be a wake-up signal, and the wake-up signal is used for indicating the terminal device to wake up within the on duration of the DRX cycle. Only upon detecting the wake-up signal, the terminal device wakes up within the on duration to detect PDCCH. Without detecting the wake-up signal, the terminal device does not perform the PDCCH detection.

The wake-up time required for the wake-up of the terminal device with different wake-up capabilities is different. Therefore, when there are terminal devices with different wake-up capabilities, it becomes an urgent problem to be solved that how to improve the transmission performance of the power-saving signal to ensure that each terminal device can effectively wake up or sleep according to the indication of the power-saving signal.

SUMMARY

Embodiments of the present disclosure provide a signal transmission method, a base station, and a network node, which, when there are terminal devices with different wake-up capabilities, are able to improve the transmission performance of the power saving signal, thereby ensuring the terminal device to effectively wake up or sleep according to the indication of the power saving signal.

According to a first aspect, there is provided a signal transmission method, including acquiring, by a base station, a wake-up capability of a terminal device; determining, by the base station, a first time position for sending power saving signal according to the wake-up capability; and sending, by the base station, the power saving signal to the terminal device at the first time position, the power saving signal being used for indicating the terminal device to wake up or sleep at a second time position; wherein, the wake-up capability includes a first wake-up capability or a second wake-up capability, and wake-up time of a terminal device with the first wake-up capability is longer than wake-up time of a terminal device with the second wake-up capability.

The wake-up time may be, for example, a time period from when the terminal device receives the power saving signal to when the terminal device completely wakes up to enable signal detection or channel detection.

Accordingly, the base station acquires the wake-up capability of the terminal device and determines the time position for sending the power saving signal according to the wake-up capability, thereby ensuring the terminal device to wake up or sleep effectively according to the indication of the power saving signal.

In combination with the first aspect, in a possible implementation of the first aspect, the determining, by the base station, a first time position for sending power saving signal according to the wake-up capability includes: determining, by the base station, a timing duration between the first time position and the second time position according to the wake-up capability; and determining, by the base station, the first time position according to the timing duration and the second time position.

In combination with the first aspect or any possible implementation thereof, in another possible implementation of the first aspect, the timing duration when the terminal device has the first wake-up capability is longer than the timing duration when the terminal device has the second wake-up capability.

In combination with the first aspect or any possible implementation thereof, in another possible implementation of the first aspect, the timing duration is a time duration between a start time-point or an end time-point of the first time position and the second time position.

In combination with the first aspect or any possible implementation thereof, in another possible implementation of the first aspect, the second time position is the first sub-frame or time slot used by the terminal device for monitoring downlink control channel in a discontinuous reception (DRX) cycle.

In combination with the first aspect or any possible implementation thereof, in another possible implementation of the first aspect, the second time position is a paging occasion (PO) for transmitting a paging message.

In combination with the first aspect or any possible implementation thereof, in another possible implementation of the first aspect, when the power saving signal indicates the terminal device to wake up at the second time position, the method further includes: sending, by the base station, the paging message to the terminal device on the PO.

In combination with the first aspect or any possible implementation thereof, in another possible implementation of the first aspect, the acquiring, by a base station, a wake-up capability of a terminal device includes: receiving, by the base station, indication information sent by a first network node, the indication information being used for indicating the wake-up capability of the terminal device.

In combination with the first aspect or any possible implementation thereof, in another possible implementation of the first aspect, the acquiring, by a base station, a wake-up capability of a terminal device includes: receiving, by the base station, a transparent container sent by a first network node, the wake-up capability of the terminal device being included in the transparent container; and acquiring, by the base station, the wake-up capability from the transparent container.

In combination with the first aspect or any possible implementation thereof, in another possible implementation of the first aspect, the first network node includes a core network node or an access network node.

In combination with the first aspect or any possible implementation thereof, in another possible implementation of the first aspect, the core network node includes a mobility management entity (MME).

In combination with the first aspect or any possible implementation thereof, in another possible implementation of the first aspect, the access network node includes an access network master node.

According to a second aspect, there is provided a signal transmission method, including signal transmission method, characterized in including: determining, by a first network node, a wake-up capability of a terminal device, the wake-up capability being used by a base station to determine a first time position for sending power saving signal, the power saving signal being used for indicating the terminal device to wake up or sleep at a second time position; and indicating, by the first network node, the wake-up capability to the base station; wherein, the wake-up capability includes a first wake-up capability or a second wake-up capability, and wake-up time of a terminal device with the first wake-up capability is longer than wake-up time of a terminal device with the second wake-up capability.

The wake-up time may be, for example, a time period from when the terminal device receives the power saving signal to when the terminal device completely wakes up to enable signal detection or channel detection.

Accordingly, the network node determines the wake-up capability of the terminal device and indicates the same to the base station, enabling the base station to determine the time position for sending the power saving signal according to the wake-up capability, thereby ensuring the terminal device to wake up or sleep effectively according to the indication of the power saving signal.

In combination with the second aspect, in a possible implementation of the second aspect, the determining, by a first network node, a wake-up capability of a terminal device includes determining, by the first network node, the wake-up capability of the terminal device according to a device identifier of the terminal device and a correspondence between the device identifier and the wake-up capability.

In combination with the second aspect or any possible implementation thereof, in another possible implementation of the second aspect, the method further includes: acquiring, by the first network node, the wake-up capability of the terminal device; and generating, by the first network node, the correspondence based on the wake-up capability.

In combination with the second aspect or any possible implementation thereof, in another possible implementation of the second aspect, the indicating, by the first network node, the wake-up capability to the base station includes: sending, by the first network node, indication information to the base station. The indication information is used for indicating the wake-up capability of the terminal device.

In combination with the second aspect or any possible implementation thereof, in another possible implementation of the second aspect, the indicating, by the first network node, the wake-up capability to the base station includes: sending, by the first network node, a transparent container to the base station, the wake-up capability of the terminal device being included in the transparent container.

In combination with the second aspect or any possible implementation thereof, in another possible implementation of the second aspect, the second time position is first sub-frame or time slot used by the terminal device for monitoring downlink control channel in a discontinuous reception (DRX) cycle.

In combination with the second aspect or any possible implementation thereof, in another possible implementation of the second aspect, the second time position is a paging occasion (PO) for transmitting a paging message.

In combination with the second aspect or any possible implementation thereof, in another possible implementation of the second aspect, the first network node includes a core network node or an access network node.

In combination with the second aspect or any possible implementation thereof, in another possible implementation of the second aspect, the core network node includes a mobility management entity (MME).

In combination with the second aspect or any possible implementation thereof, in another possible implementation of the second aspect, the access network node includes an access network master node.

According to a third aspect, there is provided a signal transmission method, including determining, by a terminal device, a first time position for receiving power saving signal according to a wake-up capability of the terminal device, the power saving signal being used for indicating the terminal device to wake up or sleep at a second time position; and receiving, by the terminal device, the power saving signal sent by a base station at the first time position.

In combination with the third aspect, in a possible implementation of the third aspect, the determining, by a terminal device, a first time position for sending power saving signal according to a wake-up capability includes: determining, by the base station, a timing duration between the first time position and the second time position according to the wake-up capability; and determining, by the base station, the first time position according to the timing duration and the second time position.

In combination with the third aspect or any possible implementation thereof, in another possible implementation of the third aspect, the timing duration when the terminal device has the first wake-up capability is longer than the timing duration when the terminal device has the second wake-up capability.

In combination with the third aspect or any possible implementation thereof, in another possible implementation of the third aspect, the timing duration is a time duration between a start time-point or an end time-point of the first time position and the second time position.

In combination with the third aspect or any possible implementation thereof, in another possible implementation of the third aspect, the second time position is the first sub-frame or time slot used by the terminal device for monitoring downlink control channel in a discontinuous reception (DRX) cycle.

In combination with the third aspect or any possible implementation thereof, in another possible implementation of the third aspect, when the power saving signal indicates the terminal device to wake up at the second time position, the method further includes monitoring, by the terminal device, a downlink control channel from the first sub-frame or time slot.

In combination with the third aspect or any possible implementation thereof, in another possible implementation of the third aspect, the second time position is a paging occasion (PO) for transmitting a paging message.

In combination with the third aspect or any possible implementation thereof, in another possible implementation of the third aspect, when the power saving signal indicates the terminal device to wake up at the second time position, the method further includes: receiving, by the terminal device, the paging message sent by the base station on the PO.

According to a fourth aspect, there is provided a base station, which can perform the method according to the first aspect or any possible implementation manner thereof. Specifically, the base station may include a functional module for performing the method according to the first aspect or any possible implementation manner thereof.

According to a fifth aspect, there is provided a network node, which is a first network node. The first network node can perform the method according to the second aspect or any possible implementation manner thereof. Specifically, the first network node may include a functional module for performing the method according to the second aspect or any possible implementation manner thereof.

According to a sixth aspect, there is provided a terminal device, which can perform the method according to the third aspect or any possible implementation manner thereof. Specifically, the terminal device may include a functional module for performing the method according to the third aspect or any possible implementation manner thereof.

According to a seventh aspect, there is provided a base station, including a processor and a memory. The memory is used for storing a computer program, and the processor is configured to call and run the computer program stored in the memory to perform the method according to the first aspect or any possible implementation manner thereof.

According to an eighth aspect, there is provide a network node. The network node is a first network node, and the first network node includes a processor and a memory. The memory is used for storing a computer program, and the processor is configured to call and run the computer program stored in the memory to perform the method according to the second aspect or any possible implementation manner thereof.

According to a ninth aspect, there is provided a terminal device. The terminal device includes a processor and a memory. The memory is used for storing a computer program, and the processor is configured to call and run the computer program stored in the memory to perform the method according to the third aspect or any possible implementation manner thereof.

According to a tenth aspect, there is provided a chip for implementing the method according to the first aspect or any possible implementation manner thereof.

Specifically, the chip includes a processor for calling and running a computer program from a memory, causing a device provided with the chip to perform the method according to the first aspect or any possible implementation manner thereof.

According to an eleventh aspect, there is provided a chip for implementing the method according to the second aspect or any possible implementation manner thereof.

Specifically, the chip includes a processor for calling and running a computer program from a memory, causing a device provided with the chip to perform the method according to the second aspect or any possible implementation manner thereof.

According to a twelfth aspect, there is provided a chip for implementing the method according to the third aspect or any possible implementation manner thereof.

Specifically, the chip includes a processor for calling and running a computer program from a memory, causing a device provided with the chip to perform the method according to the third aspect or any possible implementation manner thereof.

According to a thirteenth aspect, there is provided a computer-readable storage medium for storing a computer program that causes a computer to perform the method according to the first aspect or any possible implementation manner thereof.

According to a fourteenth aspect, there is provided a computer-readable storage medium for storing a computer program that causes a computer to perform the method according to the second aspect or any possible implementation manner thereof.

According to a fifteenth aspect, there is provided a computer-readable storage medium for storing a computer program that causes a computer to perform the method according to the third aspect or any possible implementation manner thereof.

According to a sixteenth aspect, there is provided a computer program product, including computer program instructions which cause a computer to perform the method according to the first aspect or any possible implementation manner thereof.

According to a seventeenth aspect, there is provided a computer program product, including computer program instructions which cause a computer to perform the method according to the second aspect or any possible implementation manner thereof.

According to an eighteenth aspect, there is provided a computer program product, including computer program instructions which cause a computer to perform the method according to the third aspect or any possible implementation manner thereof.

According to a nineteenth aspect, there is provided a computer program which, when running on a computer, causes the computer to perform the method according to the first aspect or any possible implementation manner thereof.

According to a twentieth aspect, there is provided a computer program which, when running on a computer, causes the computer to perform the method according to the second aspect or any possible implementation manner thereof.

According to a twenty-first aspect, there is provided a computer program which, when running on a computer, causes the computer to perform the method according to the third aspect or any possible implementation manner thereof.

According to a twenty-second aspect, there is provided a communication system, including a base station and a first network node; wherein the base station is configured to acquire a wake-up capability of a terminal device; determine a first time position for sending power saving signal according to the wake-up capability; and sending the power saving signal to the terminal device at the first time position. The network node is configured to: determine a wake-up capability of a terminal device, the wake-up capability being used by a base station to determine a first time position for sending power saving signal; and indicating the wake-up capability to the base station. The power saving signal is used for indicating the terminal device to wake up or sleep at a second time position; the wake-up capability includes a first wake-up capability or a second wake-up capability, and wake-up time of a terminal device with the first wake-up capability is longer than wake-up time of a terminal device with the second wake-up capability.

Optionally, the communication system further includes a terminal device, wherein the terminal device is configured to determine a first time position for receiving power saving signal according to a wake-up capability of the terminal device, the power saving signal being used for indicating the terminal device to wake up or sleep at a second time position; and receiving the power saving signal sent by a base station at the first time position.

Specifically, the base station is configured to perform the method according to the first aspect or any possible implementation manner thereof, and the first network node is configured to perform the method according to the second aspect or any possible implementation manner thereof, and the terminal device is configured to perform the method according to the third aspect or any possible implementation manner thereof.

BRIEF DESCRIPTION OF THE DRAWINGS

FIG. 4(a) is a schematic diagram illustrating a timing duration according to an embodiment of the present disclosure.

FIG. 4(b) is a schematic diagram illustrating a timing duration according to another embodiment of the present disclosure.

FIG. 5 is a schematic flowchart illustrating a signal transmission method according to an embodiment of the present disclosure.

DETAILED DESCRIPTION

The technical solutions of the embodiments of the present disclosure can be applied to various communication systems, for example, Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, advanced long term evolution (LTE-A) system, new radio (NR) system, NR evolution system, LTE-based access to unlicensed spectrum (LTE-U) system, NR-based access to unlicensed spectrum (NR-U) system, Universal Mobile Telecommunication System (UMTS), global Worldwide Interoperability for Microwave Access (WiMAX) communication systems, Wireless Local Area Networks (WLAN), Wireless Fidelity (WiFi), next-generation communication systems or other communication systems and the like.

Generally, traditional communication systems support a limited number of connections and are easy to be implemented. However, with the development of communication technologies, mobile communication systems will not only support traditional communication but also support, for example, Device to Device (D2D) communication, Machine to Machine (M2M) communication, Machine Type Communication (MTC), and Vehicle to Vehicle (V2V) communication and the like. The embodiments of the present disclosure can also be applied to these communication systems.

Optionally, the communication system in the embodiments of the present disclosure may be applied to a carrier aggregation (CA) scenario, a dual connectivity (DC) scenario, or a standalone (SA) network configuration.

The embodiments of the present disclosure do not limit the applied spectrum. For example, the embodiments of the present disclosure may be applied to licensed spectrum or unlicensed spectrum.

Figure 1:
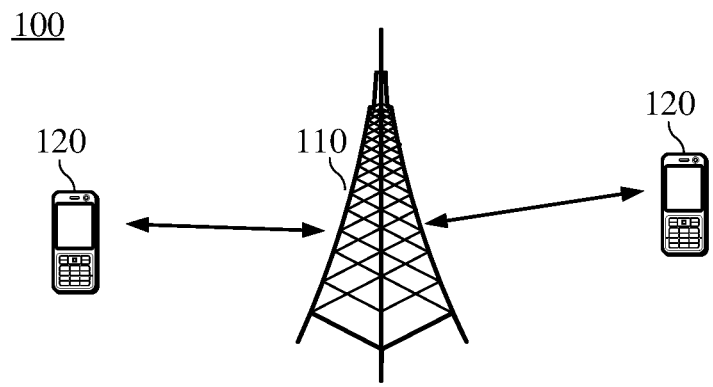
FIG. 1 is a schematic diagram illustrating a possible wireless communication system applied in an embodiment of the present disclosure.

FIG. 1 illustrates a possible wireless communication system 100 applied in the embodiments of the present disclosure. The wireless communication system 100 may include a network device 110. The network device 110 may be a device that communicates with a terminal device. The network device 110 can provide communication coverage for a specific geographic area and can communicate with terminal devices located within the coverage area. Optionally, the network device 110 may be a Base Transceiver Station (BTS) in GSM system or CDMA system, or a NodeB (NB) in WCDMA system, or an Evolutional Node B (eNB or eNodeB) in an LTE system, or a network-side device in NR system, or a wireless controller in the Cloud Radio Access Network (CRAN). Also, the network device may be a relay station, an access point, an in-vehicle device, a wearable device, a network side device in next-generation networks, or a network device in public land mobile network (PLMN) that is evolving in the future.

The wireless communication system 100 further includes at least one terminal device 120 located within the coverage of the network device 110. The terminal device 120 may be mobile or fixed. Optionally, the terminal device 120 may refer to access terminal, user equipment (UE), user unit, user station, mobile station, mobile site, remote station, remote terminal, mobile device, user terminal, terminal, wireless communication device, user agent, or user device. The access terminal may be a cellular phone, a cordless phone, a Session Initiation Protocol (SIP) phone, a Wireless Local Loop (WLL) station, a Personal Digital Assistant (PDA), or a handheld device or a computing device with a wireless communication function, or other processing devices connected to wireless modems, in-vehicle devices, wearable devices, terminal devices in future 5G networks or terminal devices in future evolved PLMNs and the like. Among them, optionally, Device to Device (D2D) communication may also be performed between the terminal devices 120.

Specifically, the network device 110 may provide services to a cell, and the terminal device 120 communicates with the network device 110 through transmission resource (for example, frequency domain resource, or spectrum resource) used by the cell, and the cell may be a cell corresponding to the network device 110 (e.g., a base station). The cell may belong to a macro base station or a base station corresponding to a small cell. The small cell here may include a metro cell, a micro cell, a pico cell, a femto cell, and the like. These small cells have the characteristics of small coverage and low transmission power, and are suitable for providing high-speed data transmission services.

FIG. 1 exemplarily illustrates one network device and two terminal devices. Optionally, the wireless communication system 100 may include multiple network devices and each network device may include other numbers of terminal devices within the coverage area, which are not limited in the embodiments of the present disclosure.

Optionally, the wireless communication system 100 may further include other network entities such as a network controller and a mobility management entity, which are not limited in the embodiments of the present disclosure.

Figure 2:
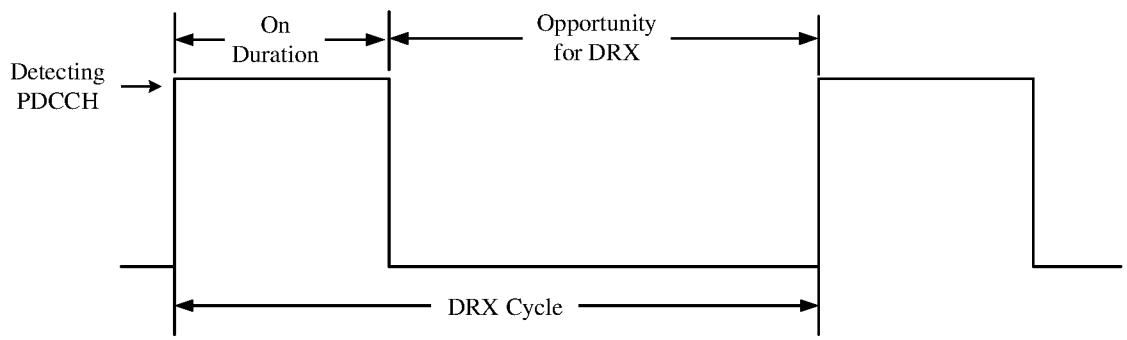
FIG. 2 is a schematic diagram illustrating a DRX cycle.

The DRX cycle of the terminal device includes an activation period (On duration) and a sleep period (Opportunity for DRX). For example, as shown in FIG. 2, the terminal device can monitor the physical downlink control channel (PDCCH) during the activation period, that is, the On duration, and the terminal device can reduce power consumption by stopping receiving the PDCCH (the terminal device will stop blind detection of the PDCCH or paging message) during the sleep period, that is, the Opportunity for DRX, thereby improving battery life. In other words, the terminal device is in the awake state during the activation period to monitor the PDCCH, and enters the sleep state during the sleep period so that no channel or signal detection is performed.

Although the network configures the terminal device with the DRX cycle to enable the terminal device to periodically monitor the PDCCH during the activation period, the terminal device is only scheduled opportunistically during the activation period. Even when the terminal device has a low traffic load, it will be scheduled only in a few DRX cycles. For paging messages that use the DRX mechanism, the terminal device has fewer opportunities to receive paging messages. Therefore, after being configured with the DRX mechanism, the terminal device may not monitor the control channel during the activation period of most DRX cycles, but it will still be awakened during the activation period of these DRX cycles, which increases unnecessary power consumption.

Therefore, the 5G system introduces a power saving signal to control the state of the terminal device to achieve power saving purposes. The power saving signal is used for controlling the wake-up and sleep states of the terminal device, so that the power consumption of the terminal device can be reduced. For example, the power saving signal may be a wake-up signal, which is used for indicating the terminal device to wake up within the "activation period" of the DRX cycle. When the terminal device detects the wake-up signal, it may wake up during one or more subsequent "activation periods" to monitor the PDCCH. When the terminal device does not detect the wake-up signal, it can remain in the sleep state without PDCCH monitoring for one or more subsequent activation periods. Also, the power saving signal may be used for indicating the terminal device to sleep during the "activation period" in the DRX cycle. When the terminal device does not detect the wake-up signal, it can wake up normally to monitor the PDCCH in one or more subsequent "activation periods." When the terminal device detects the wake-up signal, it can remain in the sleep state for one or more subsequent activation periods without performing PDCCH monitoring. Because such a type of indication information is beneficial to the power saving of the terminal device, it may be referred to as the power saving signal.

The terminal device may receive paging messages in a specific subframe (referred to as paging occasion (PO)) in a specific frame (referred to as paging radio frame or paging frame (PF)) in its paging cycle. The terminal device will detect whether there is its own paging message in the PO. The PO is a subframe on which there may be a PDCCH scrambled and indicating a paging message by using a Paging Radio Network Temporary Identity (P-RNTI). Under the DRX mechanism, the terminal device only needs to detect one PO in each DRX cycle. In other words, corresponding to each terminal device, only one subframe is used for transmitting paging messages in each paging cycle. The transmission of the paging messages can be understood as the DRX mechanism, and the length of the paging cycle may be equal to the length of the DRX cycle.

Similarly, for paging messages, the terminal will only be paged on a few POs for a long time, and there may be no paging message corresponding to the terminal in the PDCCH, where the terminal detects scheduled paging messages on most of POs. Accordingly, it is also possible to control the wake-up or sleep state of the terminal device through the power saving signal to achieve the purpose of power-saving. For example, if the network device sends a paging message to the terminal device on a certain PO, the power saving signal can be sent to the terminal device before the PO, indicating the terminal device to wake up on the PO to receive its own paging message.

Furthermore, a similar problem may occur in the PDCCH reception of the terminal device in the connected state or the PDCCH reception in the "activation period." This is because there are multiple terminal devices in a system. When the system load is high, a single terminal device only will get PDCCH scheduling over a short time period. Similarly, the service arrival of the terminal device is also uncertain in time. The network device only schedules the terminal device after the service of the terminal device arrives. Therefore, for the PDCCH reception of the terminal device in the connected state or the PDCCH reception in the "activation period", the wake-up or sleep state of the terminal device can be similarly controlled by the foregoing power saving signal to achieve the purpose of power-saving.

Different terminal devices may have different wake-up capabilities. Terminal devices with different wake-up capabilities require different wake-up time lengths. Therefore, the embodiments of the present disclosure provide that the base station acquires the wake-up capability of the terminal device and determines a time position for sending power saving signal according to the wake-up capability so that the terminal device can effectively wake up or sleep according to the indication of the power saving signal.

Figure 3:
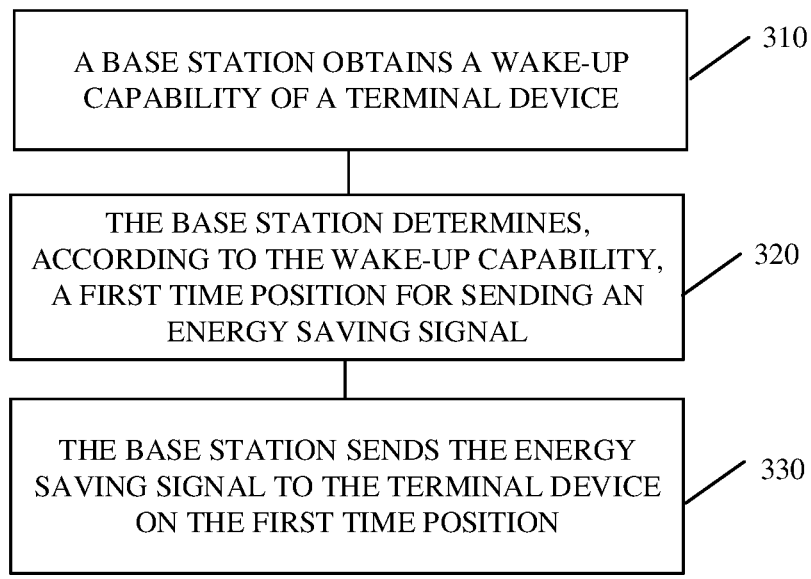
FIG. 3 is a schematic flowchart illustrating a signal transmission method according to an embodiment of the present disclosure.

FIG. 3 is a schematic flowchart illustrating a signal transmission method 300 according to an embodiment of the present disclosure. The method shown in FIG. 3 may be performed by a network device such as a base station, and the network device may be, for example, the network device 110 shown in FIG. 1. As shown in FIG. 3, the signal transmission method 300 includes at least part of the following steps.

In 310, the base station acquires a wake-up capability of the terminal device.

In 320, the base station determines a first time position for sending power saving signal according to the wake-up capability.

In 330, the base station sends the power saving signal to the terminal device at the first time position.

Optionally, the power saving signal (PSS) is used for indicating the terminal device to wake up or sleep at a second time position. The power-saving signal is, for example, a wake-up signal (WUS).

Optionally, the second time position is the first subframe or the first time slot used by the terminal device to perform downlink control channel monitoring in the DRX cycle.

Optionally, the second time position is a paging occasion (PO) used for transmitting a paging message.

In an embodiment, if the power saving signal indicates the terminal device to wake up at the second time position, the method may further include that: the base station sends the paging message to the terminal device on the PO.

The embodiment of the present disclosure does not limit the second time position. The power-saving signal may indicate the terminal device to wake up or sleep during the activation period of the subsequent DRX cycle, or may indicate the terminal device to wake up or sleep in the subsequent PO, or may indicate the terminal device to wake up or sleep at other time positions that need to be awakened for communication, for example, a time position when data arrives, which are not limited in the embodiments of the present disclosure.

In an embodiment, the wake-up capability includes a first wake-up capability or a second wake-up capability, and the wake-up time of the terminal device with the first wake-up capability is longer than the wake-up time of the terminal device with the second wake-up capability.

In the embodiments of the present disclosure, only the first wake-up capability and the second wake-up capability are described as examples, but the terminal device may also have other wake-up capabilities. These different wake-up capabilities correspond to different wake-up times. That is, the terminal devices having different wake-up capabilities require different wake-up time lengths. Therefore, the wake-up capability in the embodiments of the present disclosure may also be referred to as "wake-up time capability." The base station may determine the first time position according to the wake-up capability of the terminal device to send the power saving signal to the terminal device.

The wake-up time may be, for example, a time period from when the terminal device receives the power saving signal to when the terminal device completely wakes up to enable signal detection or channel detection.

Optionally, the terminal device with the first wake-up capability uses a receiver and a processor operating at low power consumption to receive and process the power saving signal and, when the power saving signal indicates the terminal device to wake up at a second time position thereafter, enables a general receiver and a general processor to receive and process other communication signals transmitted at the second time position. The terminal devices with the second wake-up capability use the general receiver and the general processor to receive and process both the power saving signal and other communication signals.

The receivers and processors that operate at low power consumption are optimized to operate at lower power consumption. The terminal device with the second wake-up capability enables its general receiver to sample the power saving signal before receiving the power saving signal, and the terminal device enables the general processor to process the sampled power saving signal. The terminal device with the first wake-up capability uses the receiver and the processor operating at low power consumption respectively to receive and process the power saving signal and, only when the power saving signal indicates the terminal device to wake up, enables its general receiver and general processor to transceive and process uplink and downlink communication signals, thereby greatly reducing the power consumption of the terminal device for receiving and processing power saving signals. However, the terminal device with the first wake-up capability needs to turn on its general receiver and processor at the moment when it receives, processes, and recognizes that the power saving signal indicates the terminal device to wake up. Compared with the terminal device with the second wake-up capability, the wake-up time of the terminal device with the first wake-up capability is longer. Therefore, for terminal devices with different wake-up capabilities, the first time positions at which the base station sends the power saving signal are also different.

Therefore, the base station acquires the wake-up capability of the terminal device and determines the time position for sending the power saving signal according to the wake-up capability, thereby ensuring that the terminal device can wake up or sleep effectively according to the indication of the power saving signal.

Optionally, in 320, the determining, by the base station, the first time position for sending power saving signal according to the wake-up capability includes: determining, by the base station, a timing duration between the first time position and the second time position according to the wake-up capability; and determining, by the base station, the first time position according to the timing duration and the second time position.

It should be understood that the timing duration should be longer than or equal to the wake-up time of the terminal device. That is, it is at least to be ensured that the terminal device has sufficient time to wake up for signal detection or channel detection after receiving the power saving signal indicating it to wake up.

Optionally, the timing duration when the terminal device has the first wake-up capability is longer than the timing duration when the terminal device has the second wake-up capability.

Optionally, the timing duration a timing duration between a start time point or an end time point of the first time position and a start time point of the second time position.

Since the wake-up time of the terminal device with the first wake-up capability is longer than the wake-up time of the terminal device with the second wake-up capability, for the terminal devices with different wake-up capabilities, the first time positions at which the network device sends the power saving signal may be different. For example, for a terminal device with the first wake-up capability, since its wake-up time is longer, the timing duration between the first time position and the second time position may be set longer; for a terminal device with the second wake-up capability, since its wake-up time is shorter, so the timing duration between the first time position and the second time position may be set shorter.

For example, as shown in FIG. 4(*a*), the timing duration is the duration between the start time point of the first time position and the second time position.

For another example, as shown in FIG. 4(*b*), the timing duration is the duration between the end time point of the first time position and the second time position.

As can be seen from FIGS. 4(*a*) and 4(*b*), the first time position at which the base station sends the power saving signal to the terminal device with the first wake-up capability is earlier than that the base station sends the power saving signal to the terminal device with the second wake-up capability. That is, the timing duration 1 corresponding to the terminal device having the first wake-up capability is longer than the timing duration 2 corresponding to the terminal device having the second wake-up capability.

It should be understood that the power saving signal is used for indicating the terminal device to wake up or sleep at the second time position. Whether the power saving signal indicates wake-up or sleep, the base station determines the first time position to send the power saving signal according to the wake-up capability of the terminal device. In other words, the indication of wake-up or sleep can be realized by the same signal, that is, the power saving signal, and whether to wake up or sleep indicated by the power saving signal is regardless of the process for determining the first time position at which the power saving signal is sent.

Optionally, in 310, the acquiring, by the base station, the wake-up capability of the terminal device includes: receiving, by the base station, indication information sent by a first network node, the indication information being used for indicating the wake-up capability of the terminal device.

Optionally, in 310, the acquiring, by the base station, the wake-up capability of the terminal device includes: receiving, by the base station, a transparent container sent by a first network node, the wake-up capability of the terminal device being included in the transparent container; and acquiring, by the base station, the wake-up capability from the transparent container.

The first network node may include, for example, a core network node, which may be applied in a scenario of core network paging; or the first network node may include an access network node, which may be applied to a scenario of radio access network (RAN) paging.

The core network node may be, for example, a Mobility Management Entity (MME), or may be other core network nodes such as an evolved packet core (EPC), an access and mobility management function (AMF), or session management function (SMF) in LTE network.

The access network node may be, for example, an access network master node (also referred to as an "anchor node"). The access network master node may be, for example, connected to the core network through a wired connection, and other access network nodes such as the base station may connect to the master node and transmits data to the core network through the master node in a wireless connection manner.

Optionally, in 310, the base station may acquire the wake-up capability of the terminal device by determining the wake-up capability of the terminal device according to the device identifier (UE ID) of the terminal device and a correspondence between saved device identifiers and wake-up capabilities. The base station may receive the wake-up capability reported by the terminal device, thereby establishing the correspondence between the device identifiers and the wake-up capabilities.

FIG. 5 is a schematic flowchart illustrating a signal transmission method 500 according to an embodiment of the present disclosure. The method shown in FIG. 5 may be, for example, executed by the first network node. Optionally, the first network node may be a core network node such as MME, AMF, SMF and the like, or may also be an access network node such as an access network master node. As shown in FIG. 5, the signal transmission method 500 includes at least part of the following steps.

In 510, the first network node determines the wake-up capability of the terminal device, and the wake-up capability is used by the base station to determine the first time position for sending the power saving signal.

Optionally, the power saving signal is used for indicating the terminal device to wake up or sleep at the second time position.

Optionally, the second time position is the first subframe or the first time slot used by the terminal device to monitor the downlink control channel in the DRX cycle.

Optionally, the second time position is a PO used for transmitting paging messages.

In an embodiment, if the power saving signal indicates the terminal device to wake up at the second time position, the first network node will trigger the base station to send a paging message for the terminal device to the terminal device on the PO.

In 520, the first network node indicates the wake-up capability to the base station.

In an embodiment, the wake-up capability includes a first wake-up capability or a second wake-up capability, and the wake-up time of the terminal device with the first wake-up capability is longer than the wake-up time of the terminal device with the second wake-up capability.

The wake-up time may be, for example, the duration from when the terminal device receives the power saving signal to when the terminal device completely wakes up to enable signal detection or channel detection.

Optionally, the terminal device with the first wake-up capability uses a receiver and a processor operating at low power consumption to receive and process the power saving signal and, when the power saving signal indicates the terminal device to wake up at a second time position thereafter, enables a general receiver and a general processor to receive and process other communication signals transmitted at the second time position. The terminal devices with the second wake-up capability use the general receiver and the general processor to receive and process both the power saving signal and other communication signals.

Therefore, the first network node determines the wake-up capability of the terminal device and indicates the wake-up capability to the base station, so that the base station can determine the time position for sending the power saving signal to the terminal device according to the wake-up capability, thereby ensuring that the terminal device can wake up or sleep effectively according to the indication of the power saving signal.

Optionally, in 310, the determining, by the first network node, the wake-up capability of the terminal device includes: determining, by the first network node, the wake-up capability of the terminal device according to the device identifier (UE ID) of the terminal device, and the correspondence between the device identifiers and the wake-up capabilities.

Optionally, before 310, the method further includes: the first network node generates the correspondence.

Further, optionally, the first network node acquires the wake-up capabilities of terminal devices and generates the correspondence according to the wake-up capabilities.

For example, the terminal devices may report their wake-up capabilities to the first network node, and the first network node may receive the wake-up capabilities of the terminal devices reported by them and record the correspondence between the wake-up capabilities and the UE IDs of the terminal devices.

Optionally, in 520, the indicating, by the first network node, the wake-up capability to the base station includes: sending, by the first network node, indication information to the base station, where the indication information is used for indicating the wake-up capability of the terminal device.

Or, optionally, in 520, the indicating, by the first network node, the wake-up capability to the base station includes: sending, by the first network node, a transparent container to the base station, and the transparent container includes therein the wake-up capability of the terminal device.

Taking as an example that the first network node is MME, after acquiring the wake-up capability of the terminal device, the MME may save information about the wake-up capability of the terminal device. For example, the MME records the correspondence between the UE ID of the terminal device and the wake-up capability, thereby forming a record table of wake-up capability information (e.g., as shown in Table 1) and storing the same. When the MME triggers the base station to send a paging message to the terminal, the MME may query the wake-up capability information record table based on the UE ID of the terminal device, so as to determine the wake-up capability of the terminal device and send the wake-up capability information to the base station. Alternatively, the MME may also encapsulate the information about the wake-up capability of the terminal device in a transparent container. When the MME receives the transparent container including the wake-up capability of the terminal device, the MME saves it. When the MME sends a paging message to the terminal device, the MME sends the transparent container including the information about the wake-up capability of the terminal device to the base station.

Taking as an example that the first network node is a master node, after the master node acquires the wake-up capability of the terminal device, it may save the information about the wake-up capability of the terminal device. For example, the master node records the correspondence between the UE ID of the terminal device and the wake-up capability, thereby forming a record table of wake-up capability information (e.g., as shown in Table 1) and storing the same. When the master node triggers the base station to send a paging message to the terminal, the master node may query the wake-up capability information record table based on the UE ID of the terminal device, so as to determine the wake-up capability of the terminal device, and send the wake-up capability information to the base station. Alternatively, the master node may also encapsulate the information about the wake-up capability of the terminal device in a transparent container. When the master node receives the transparent container including the wake-up capability of the terminal device, the master node saves it. When the master node sends a paging message to the terminal device, the master node sends the transparent container including the information of the wake-up capability of the terminal device to the base station.

TABLE 1

| UE IDs | Wake-up Capabilities |
|---|---|
| UE ID 1 | First Wake-up Capability |
| UE ID 2 | Second Wake-up Capability |
| ... | ... |
| UE ID n | Second Wake-up Capability |
| ... | ... |

Optionally, after acquiring the wake-up capability of the terminal device, the first network node may also determine the first time position at which the base station sends the power saving signal to the terminal device according to the wake-up capability of the terminal device. For example, the first network node determines the timing duration between the first time position and the second time position according to the wake-up capability of the terminal device and, after determining the first time position according to the timing duration and the second time position, indicates the first time position to the base station.

It should be understood that, for specific details of the wake-up capability and the timing duration indicated by the first network node to the base station, reference may be made to the related description of the base station with reference to FIG. 3. For the sake of brevity, details are not repeated here.

It should be noted that, without conflict, the embodiments described in this application and/or the technical features in each embodiment can be arbitrarily combined with each other, and the technical solution obtained with the combination should also fall within the protection scope of this application.

It should be understood that in various embodiments of the present disclosure, the size of the sequence numbers of the above processes does not mean that the execution order is sequential, and the execution order of each process should be determined by its function and inherent logic, and should constitute no limitation to the implementation process of the embodiments of the present disclosure.

The communication method according to embodiments of the present disclosure has been described in detail above, and the device according to the embodiments of the present disclosure will be described below with reference to FIG. 6 to FIG. 9. The technical features described in the method embodiment are applicable to the following device embodiments.

Figure 6:
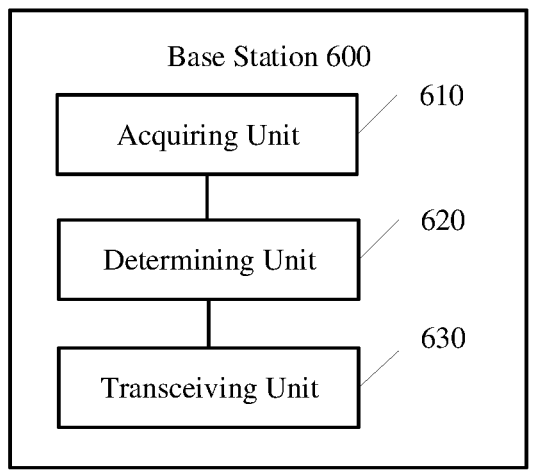
FIG. 6 is a block diagram illustrating a base station according to an embodiment of the present disclosure.

FIG. 6 is a block diagram illustrating a base station 600 according to an embodiment of the present disclosure. As shown in FIG. 6, the base station 600 includes an acquiring unit 610, a determining unit 620 and a transceiving unit 630.

The acquiring unit 610 is configured to acquire a wake-up capability of a terminal device.

The determining unit 620 is configured to determine a first time position for sending power saving signal according to the wake-up capability acquired by the acquiring unit 610.

The transceiving unit 630 is configured to send the power saving signal to the terminal device at the first time position determined by the determining unit 620, the power saving signal being used for indicating the terminal device to wake up or sleep at a second time position, wherein, the wake-up capability includes a first wake-up capability or a second wake-up capability, and wake-up time of a terminal device with the first wake-up capability is longer than wake-up time of a terminal device with the second wake-up capability.

Accordingly, the base station acquires the wake-up capability of the terminal device and determines the time position for sending power saving signal according to the wake-up capability, thereby ensuring that the terminal device can effectively wake up or sleep according to the indication of the power saving signal.

Optionally, the determining unit 620 is specifically configured to: determine a timing duration between the first time position and the second time position according to the wake-up capability; and determine the first time position according to the timing duration and the second time position.

Optionally, the timing duration when the terminal device has the first wake-up capability is longer than the timing duration when the terminal device has the second wake-up capability.

Optionally, the timing duration is a time duration between a start time-point or an end time-point of the first time position and the second time position.

Optionally, the second time position is the first subframe or the first time slot used by the terminal device for monitoring downlink control channel in the discontinuous reception (DRX) cycle.

Optionally, the second time position is a paging occasion (PO) for transmitting a paging message.

Optionally, if the power saving signal indicates the terminal device to wake up at the second time position, the transceiving unit 630 is further configured to: send, by the base station, the paging message to the terminal device on the PO.

Optionally, the acquiring unit 610 is specifically configured to: receive, through the transceiving unit 630, indication information sent by a first network node, the indication information being used for indicating the wake-up capability of the terminal device.

Optionally, the acquiring unit 610 is specifically configured to: receive, through the transceiving unit 630, a transparent container sent by a first network node, the wake-up capability of the terminal device being included in the transparent container; and acquire the wake-up capability from the transparent container.

Optionally, the first network node comprises a core network node or an access network node.

Optionally, the core network node comprises a mobility management entity (MME).

Optionally, the access network node comprises an access network master node.

It should be understood that the base station 600 may be configured to perform corresponding operations performed by the base station in the method 300 as described above. For the sake of brevity, details will not be repeated here.

Figure 7:
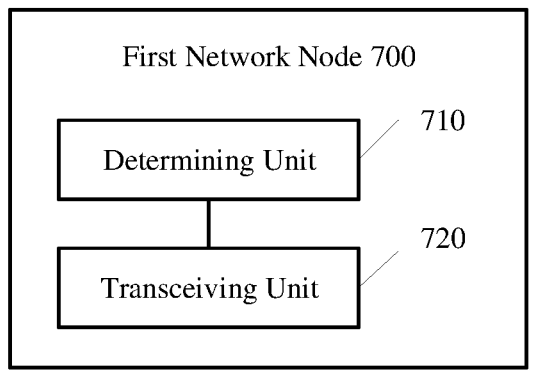
FIG. 7 is a block diagram illustrating a network node according to an embodiment of the present disclosure.

FIG. 7 is a block diagram illustrating a network node 700 according to an embodiment of the present disclosure. The network node is the first network node. As shown in FIG. 7, the first network node 700 includes a determining unit 710 and a transceiving unit 720.

The determining unit 710 is configured to determine a wake-up capability of a terminal device, the wake-up capability being used by a base station to determine a first time position for sending power saving signal, the power saving signal being used for indicating the terminal device to wake up or sleep at a second time position.

The transceiving unit 720 is configured to indicate the wake-up capability determined by the determining unit 710 to the base station.

In an embodiment, the wake-up capability comprises a first wake-up capability or a second wake-up capability, and wake-up time of a terminal device with the first wake-up capability is longer than wake-up time of a terminal device with the second wake-up capability.

Accordingly, the network node determines the wake-up capability of the terminal device and indicates the same to the base station, so that the base station can determine the time position for sending power saving signal according to the wake-up capability, thereby ensuring that the terminal device can effectively wake up or sleep according to the indication of the power saving signal.

Optionally, the determining unit 710 is specifically configured to: determine the wake-up capability of the terminal device according to a device identifier of the terminal device and a correspondence between the device identifier and the wake-up capability.

Optionally, the first network node further includes an acquiring unit, configured to acquire the wake-up capability of the terminal device; and a processing unit, configured to generate the correspondence based on the wake-up capability.

Optionally, the transceiving unit 720 is specifically configured to: send indication information to the base station, the indication information being used for indicating the wake-up capability of the terminal device.

Optionally, the transceiving unit 720 is specifically configured to: send a transparent container to the base station, the wake-up capability of the terminal device being included in the transparent container.

Optionally, the second time position is first sub-frame or time slot used by the terminal device for monitoring downlink control channel in a discontinuous reception (DRX) cycle.

Optionally, the second time position is a paging occasion (PO) for transmitting a paging message.

Optionally, the first network node comprises a core network node or an access network node.

Optionally, the core network node comprises a mobility management entity (MME).

Optionally, the access network node comprises an access network master node.

It should be understood that, the network node 700 may be configured to perform corresponding operations performed by the first network node in the method 500 as described above. For the sake of brevity, details will not be repeated here.

Figure 8:
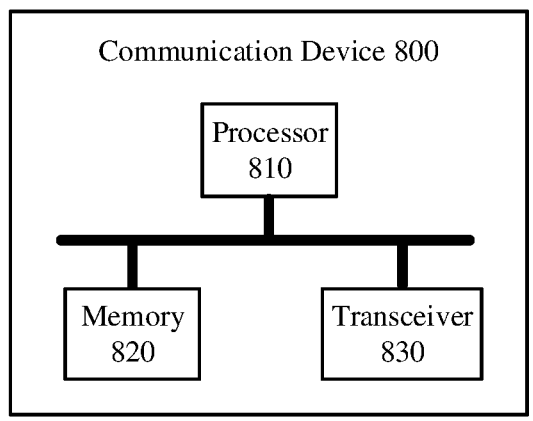
FIG. 8 is a schematic structural diagram illustrating a communication device according to an embodiment of the present disclosure.

FIG. 8 is a schematic structural diagram illustrating a communication device 800 according to an embodiment of the present disclosure. The communication device 800 shown in FIG. 8 includes a processor 810, and the processor 810 may call and run a computer program from a memory to implement the method in the embodiments of the present disclosure.

Optionally, as shown in FIG. 8, the communication device 800 may further include a memory 820. The processor 810 may call and run the computer program from the memory 820 to implement the method in the embodiments of the present disclosure.

The memory 820 may be a separate device independent of the processor 810, or may be integrated in the processor 810.

Optionally, as shown in FIG. 8, the communication device 800 may further include a transceiver 830, and the processor 810 may control the transceiver 830 to communicate with other devices. Specifically, the transceiver 830 may be controlled to send information or data to other devices, or receive information or data sent by other devices.

In an embodiment, the transceiver 830 may include a transmitter and a receiver. The transceiver 830 may further include antennas, and the number of antennas may be one or more.

Optionally, the communication device 800 may be a base station according to an embodiment of the present disclosure, and the communication device 800 may implement the corresponding process implemented by the base station in each method embodiment of the present disclosure. For brevity, details are not described herein again.

Optionally, the communication device 800 may be the first network node according to any embodiment of the present disclosure, and the communication device 800 may implement the corresponding process implemented by the first network node in each method embodiment of the present disclosure. For brevity, details are not described herein again.

Figure 9:
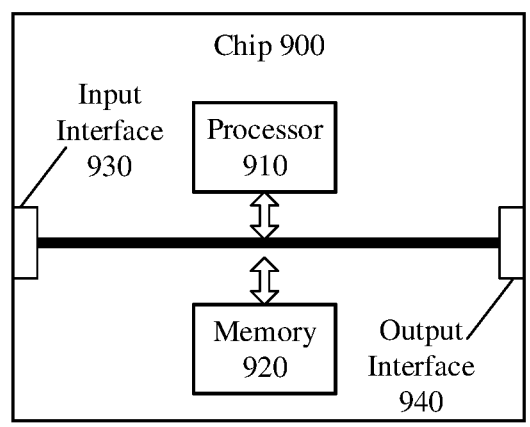
FIG. 9 is a schematic structural diagram illustrating a chip according to an embodiment of the present disclosure.

FIG. 9 is a schematic structural diagram illustrating a chip 900 according to an embodiment of the present disclosure. The chip 900 shown in FIG. 9 includes a processor 910, and the processor 910 may call and run a computer program from the memory to implement the method in the embodiment of the present disclosure.

Optionally, as shown in FIG. 9, the chip 900 may further include a memory 920. The processor 910 may call and run a computer program from the memory 920 to implement the method in the embodiments of the present disclosure.

The memory 920 may be a separate device independent of the processor 910, or may be integrated in the processor 910.

Optionally, the chip 900 may further include an input interface 930. The processor 910 can control the input interface 930 to communicate with other devices or chips. Specifically, the input interface can obtain information or data sent by other devices or chips.

Optionally, the chip 900 may further include an output interface 940. The processor 910 can control the output interface 940 to communicate with other devices or chips. Specifically, the output interface can output information or data to other devices or chips.

Optionally, the chip can be applied to the base station in the embodiment of the present disclosure, and the chip can implement the corresponding process implemented by the base station in each method embodiment of the present disclosure.

Optionally, the chip can be applied to the network node in the embodiment of the present disclosure, and the chip can implement the corresponding process implemented by the first network node in each method embodiment of the present disclosure.

It should be understood that the chips mentioned in the embodiments of the present disclosure may also be referred to as system-on-chips, system chips, chip systems, or system-on-chip chips.

The processor mentioned above may be a general-purpose processor, a digital signal processor (DSP), a field programmable gate array (FPGA), an application specific integrated circuit (ASIC), or other programmable logic devices, transistor logic devices, discrete hardware components, and the like. In an embodiment, the aforementioned general-purpose processor may be a microprocessor or any conventional processor.

The above-mentioned memory may be volatile memory or non-volatile memory, or may include both volatile and non-volatile memory. In an embodiment, the non-volatile memory can be read-only memory (ROM), programmable read-only memory (Programmable ROM, PROM), erasable programmable read-only memory (Erasable PROM, EPROM), electronically erasable programmable read only memory (Electrically EPROM, EEPROM) or flash memory. The volatile memory may be a random access memory (RAM).

It should be understood that the foregoing memory is exemplary but not limiting, for example, the memory in the embodiments of the present disclosure may also be static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchronous connection Dynamic random access memory (Synch Link DRAM, SLDRAM) and direct memory bus random access memory (Direct Rambus RAM, DR RAM), and the like. That is to say, the memories in the embodiments of the present disclosure are intended to include but are not limited to these and any other suitable types of memories.

Figure 10:
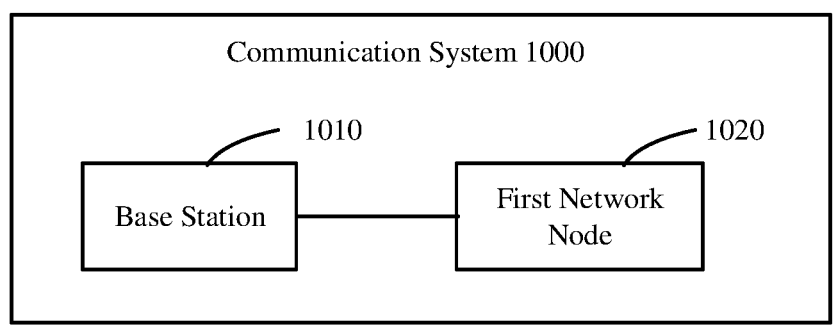
FIG. 10 is a schematic block diagram illustrating a communication system according to an embodiment of the present disclosure.

FIG. 10 is a schematic block diagram illustrating a communication system 1000 according to an embodiment of the present disclosure. As shown in FIG. 10, the communication system 1000 includes a base station 1010 and a first network node 1020.

In an embodiment, the base station 1010 is configured to acquire a wake-up capability of a terminal device; determine a first time position for sending power saving signal according to the wake-up capability; and sending the power saving signal to the terminal device at the first time position.

In an embodiment, the network node 1020 is configured to determine a wake-up capability of a terminal device, the wake-up capability being used by the base station to determine a first time position for sending power saving signal; and indicating the wake-up capability to the base station.

In an embodiment, the power saving signal is used for indicating the terminal device to wake up or sleep at a second time position; the wake-up capability includes a first wake-up capability or a second wake-up capability, and wake-up time of a terminal device with the first wake-up capability is longer than wake-up time of a terminal device with the second wake-up capability.

In an embodiment, the base station 1010 may be used to implement the corresponding functions implemented by the base station in the above method 300, and the composition of the base station 1010 can be as shown by the base station 600 in FIG. 6. For brevity, details are not described herein again.

The first network node 1020 may be used to implement the corresponding functions implemented by the first network node in the above method 500, and the composition of the first network node 1020 may be as shown by the first network node 700 in FIG. 7. For brevity, details are not described herein again.

It should be understood that in the embodiment of the present disclosure, "B corresponding to A" means that B is associated with A, and B can be determined according to A. However, it should also be understood that determining B based on A does not mean determining B based on A alone, and B may also be determined based on A and/or other information.

Those of ordinary skill in the art may realize that the units and algorithm steps of the examples described in conjunction with the embodiments disclosed herein can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of this application.

Those skilled in the art can clearly understand that for the convenience and conciseness of the description, the specific working process of the system, device and unit described above can refer to the corresponding process in the foregoing method embodiments, which will not be repeated here.

In the several embodiments provided in this application, it should be understood that the disclosed system, device, and method may be implemented in other ways. For example, the device embodiments described above are only schematic. For example, the division of the unit is only a division of logical functions. In actual implementation, there may be another division manner, for example, multiple units or components may be combined or may be integrated into another system, or some features can be ignored, or not implemented. In addition, the displayed or discussed mutual coupling or direct coupling or communication connection may be indirect coupling or communication connection through some interfaces, devices or units, and may be in electrical, mechanical, or other forms.

The units described as separate components may be or may not be physically separated, and the components displayed as units may be or may not be physical units. That is, they may be located in one place, or may be distributed on multiple network units. Some or all of the units may be selected according to actual needs to achieve the purpose of the solution of this embodiment.

In addition, each functional unit in each embodiment of the present disclosure may be integrated into one processing unit, or each unit may exist alone physically, or two or more units may be integrated into one unit.

If the functions are implemented in the form of software functional units and sold or used as independent products, they can be stored in a computer-readable storage medium. Based on such an understanding, the technical solution of the present disclosure essentially or part of the contribution to the existing technology or part of the technical solution can be embodied in the form of a software product, and the computer software product is stored in a storage medium, including several instructions used to enable a computer device (which may be a personal computer, a server, or a network device, etc.) to perform all or part of the steps of the methods described in the embodiments of the present disclosure. The foregoing storage media include U disk, mobile hard disk, read-only memory (ROM), random access memory (RAM), magnetic disk or optical disk and other media that can store program codes.

The above is only the specific implementation of this application, but the scope of protection of this application is not limited to this, any person skilled in the art can easily think of changes or replacements within the technical scope disclosed in this application. It should be covered by the scope of protection of this application. Therefore, the protection scope of the present disclosure shall be subject to the protection scope of the claims.

What is claimed is:

1. A method for signal transmission, comprising:
    acquiring, by a base station, a wake-up capability of a terminal device;
    determining, by the base station, a first time position for sending power saving signal according to the wake-up capability; and
    sending, by the base station, the power saving signal to the terminal device at the first time position, the power saving signal being used for indicating the terminal device to wake up at a second time position, wherein the second time position is a paging occasion (PO) for transmitting a paging message,
    wherein the wake-up capability comprises a first wake-up capability or a second wake-up capability, and a wake-up time corresponding to the first wake-up capability is longer than a wake-up time corresponding to the second wake-up capability,
    wherein the acquiring, by the base station, the wake-up capability of the terminal device comprises:
        receiving, by the base station, a transparent container sent by a first network node, wherein the wake-up capability of the terminal device is included in the transparent container and the first network node comprises a mobility management entity (MME); and
        acquiring, by the base station, the wake-up capability from the transparent container.

2. The method according to claim 1, wherein the determining, by the base station, a first time position for sending power saving signal according to the wake-up capability comprises:
    determining, by the base station, a timing duration between the first time position and the second time position according to the wake-up capability; and
    determining, by the base station, the first time position according to the timing duration and the second time position.

3. The method according to claim 2, wherein the timing duration when the terminal device has the first wake-up capability is longer than the timing duration when the terminal device has the second wake-up capability.

4. The method according to claim 2, wherein the timing duration is a time duration between a start time-point or an end time-point of the first time position and a start time-point of the second time position.

5. The method according to claim 1, wherein the second time position is a sub-frame or time slot, which is the first of the sub-frames or time slots for the terminal device to monitor downlink control channel in a discontinuous reception (DRX) cycle.

6. The method according to claim 1, wherein the method further comprises:
    sending, by the base station, the paging message to the terminal device on the PO.

7. The method according to claim 1, wherein the wake-up time corresponding to the first wake-up capability is a time period that the terminal device with the first wake-up capability needs for waking up, the wake-up time corresponding to the second wake-up capability is a wake-up time that the terminal device with the second wake-up capability needs for waking up.

8. A base station, comprising:
    a processor, configured to acquire a wake-up capability of a terminal device, and determine a first time position for sending power saving signal according to the wake-up capability; and
    a transceiver, configured to send the power saving signal to the terminal device at the first time position determined by the processor, the power saving signal being used for indicating the terminal device to wake up at a second time position, wherein the second time position is a paging occasion (PO) for transmitting a paging message,
    wherein the wake-up capability comprises a first wake-up capability or a second wake-up capability, and a wake-up time corresponding to the first wake-up capability is longer than a wake-up time corresponding to the second wake-up capability,
    wherein the transceiver is further configured to:
        receive a transparent container sent by a first network node, wherein the wake-up capability of the terminal device is included in the transparent container and the first network node comprises a mobility management entity (MME); and
        acquire the wake-up capability from the transparent container.

9. The base station according to claim 8, wherein the processor is specifically configured to:
    determine a timing duration between the first time position and the second time position according to the wake-up capability; and
    determine the first time position according to the timing duration and the second time position.

10. The base station according to claim 9, wherein the timing duration when the terminal device has the first wake-up capability is longer than the timing duration when the terminal device has the second wake-up capability.

11. The base station according to claim 9, wherein the timing duration is a time duration between a start time-point or an end time-point of the first time position and a start time-point of the second time position.

12. The base station according to claim 8, wherein the second time position is a sub-frame or time slot, which is the first of the sub-frames or time slots for the terminal device to monitor downlink control channel in a discontinuous reception (DRX) cycle.

13. The base station according to claim 8, wherein the transceiver is further configured to:
send the paging message to the terminal device on the PO.

14. The base station according to claim 8, wherein the wake-up time corresponding to the first wake-up capability is a wake-up time that the terminal device with the first wake-up capability needs for waking up, the wake-up time corresponding to the second wake-up capability is a wake-up time that the terminal device with the second wake-up capability needs for waking up.

15. A method for signal transmission, comprising:
reporting, by a terminal device, a wake-up capability of the terminal device to a first network node, wherein the wake-up capability is included in a transparent container sent from the first network node to a base station, acquired by the base station from the transparent container and used by the base station for determining a first time position for sending power saving signal, and the first network node comprises a mobility management entity (MME); and
receiving, by the terminal device, the power saving signal from the base station at the first time position, the power saving signal being used for indicating the terminal device to wake up at a second time position, wherein the second time position is a paging occasion (PO) for transmitting a paging message,
wherein the wake-up capability comprises a first wake-up capability or a second wake-up capability, and a wake-up time corresponding to the first wake-up capability is longer than a wake-up time corresponding to the second wake-up capability.

16. The method according to claim 15, wherein the wake-up capability is used by a base station for determining a timing duration between the first time position and the second time position, causing the base station to determine the first time position according to the timing duration and the second time position, and
wherein the timing duration is a time duration between a start time-point or an end time-point of the first time position and a start time-point of the second time position.

17. The method according to claim 16, wherein the timing duration when the terminal device has the first wake-up capability is longer than the timing duration when the terminal device has the second wake-up capability.

18. The method according to claim 15, wherein the second time position is a sub-frame or time slot, which is the first of the sub-frames or time slots for the terminal device to monitor downlink control channel in a discontinuous reception (DRX) cycle.

19. The method according to claim 15, further comprising:
receiving, by the terminal device, the paging message from the base station on the PO.

20. A terminal device, comprising a processor and a transceiver, wherein processor is configured to:
report, through the transceiver, a wake-up capability of the terminal device to a first network node, wherein the wake-up capability is indicated included in a transparent container sent from the first network node to a base station, acquired by the base station from the transparent container and used by the base station for determining a first time position for sending power saving signal, and the first network node comprises a mobility management entity (MME); and
receive, through the transceiver, the power saving signal from the base station at the first time position, the power saving signal being used for indicating the terminal device to wake up at a second time position, wherein the second time position is a paging occasion (PO) for transmitting a paging message,
wherein the wake-up capability comprises a first wake-up capability or a second wake-up capability, and a wake-up time corresponding to the first wake-up capability is longer than a wake-up time corresponding to the second wake-up capability.

21. The terminal device according to claim 20, wherein the wake-up capability is used by a base station for determining a timing duration between the first time position and the second time position, causing the base station to determine the first time position according to the timing duration and the second time position, and
wherein the timing duration is a time duration between a start time-point or an end time-point of the first time position and a start time-point of the second time position.

22. The terminal device according to claim 20, wherein the processor is further configured to:
receive, through the transceiver, the paging message from the base station on the PO.

* * * * *